(12) United States Patent
Yagi (10) Patent No.: US 6,240,497 B1
(45) Date of Patent: May 29, 2001

(54) DIGITAL SIGNAL PROCESSOR WITH MANAGEMENT OF MEMORY ALLOCATION BETWEEN PROGRAM AND DATA MEMORY

(75) Inventor: Minoru Yagi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/084,803

(22) Filed: May 26, 1998

(30) Foreign Application Priority Data

May 27, 1997  (JP) .................................................. 9-136890

(51) Int. Cl.[7] .................................................. G06F 12/10
(52) U.S. Cl. .......................... 711/170; 711/171; 711/172
(58) Field of Search .................................. 710/127, 128, 710/170; 711/172, 171, 212

(56) References Cited

U.S. PATENT DOCUMENTS

| | | | |
|---|---|---|---|
| 5,584,010 | * 12/1996 | Kawai et al. ........................ | 711/117 |
| 5,630,099 | * 5/1997 | MacDonald et al. ................ | 711/172 |
| 5,799,138 | * 8/1998 | Yoshida .............................. | 358/1.15 |
| 5,819,054 | * 10/1998 | Ninomiya et al. .................... | 710/128 |
| 5,862,396 | * 1/1999 | Motomura ............................. | 712/14 |
| 5,909,557 | * 6/1999 | Betker et al. ........................ | 710/104 |

* cited by examiner

Primary Examiner—Matthew Kim
Assistant Examiner—C. P. Chace
(74) Attorney, Agent, or Firm—Ostrolenk, Faber, Gerb & Soffen, LLP (57) ABSTRACT

In a memory system, a plurality of memories having different bit widths from each other and each including at least one block and a plurality of buses are provided. At least one selector is connected between the block and at least two of the buses and selectively connects the block to one of the at least two buses.

39 Claims, 8 Drawing Sheets

DIGITAL SIGNAL PROCESSOR WITH MANAGEMENT OF MEMORY ALLOCATION BETWEEN PROGRAM AND DATA MEMORY

BACKGROUND OF THE INVENTION

1. Field of the Invention

The present invention relates to a memory system included in a digital signal processor or the like.

2. Description of the Related Art

Generally, in a digital signal processor, separate memory spaces are provided for programs and data. Sometimes, however, program memory space runs short, and excess data memory space exists, and it would be desirable to be able to reallocate memory from one to the other. Typically, however, the memory space is completely divided into a program space and a data space. That is, a program memory is connected to only a data bus. Thus, since the program memory and the data memory are completely independent of each other, there is no way to use part of the program memory data memory and vice versa.

In order to permit reallocation between the program memory and the data memory, in one digital signal processor design, the system includes a program bus, a data bus, a large scale memory space and a memory priority sequence controller, so that the user can freely allocate the memory space between the memory spaces for the program bus and the data bus as required. A system of this kind is shown in Japan patent application 63-303452, published Dec. 12, 1988.

In the above-described prior art memory system, however, the program bus has the same bit width as the data bus. However, in some digital signal processors such as the PD7701X family manufactured by NEC Corporation, a program memory having a bit width of 32 bits and two data memories each having a bit width of 16 bits are provided. That is, a program memory space and two data memory spaces are provided. The two data memory spaces are helpful in carrying out pipeline processing Because the program bus and the data bus in these digital signal processors have different bit widths, the memory management scheme shown in Japan published application 63-303452 can not be used. If additional data or program memory is needed, the onboard memory must be increased, or external memory must be provided, which increases the manufacturing cost. In addition, the memory priority sequence controller in the published application dissipates a large amount of power.

SUMMARY OF THE INVENTION

It is an object of the present invention to improve the adaptability of memory space in a memory system including a program memory and at least two data memories having a different bit width from the program memory.

According to the present invention, in a memory system, a plurality of memories having different bit widths from each other and each including at least one memory block and a plurality of buses are provided. At least one selector is connected between the block and at least two of the buses and selectively connects the block to one of the at least the buses.

The selector freely allocates the memory spaces of the memories, thus substantially increasing the memory capacity. In addition, the selector dissipates hardly any power.

BRIEF DESCRIPTION OF THE DRAWINGS

The present invention will be more clearly understood from the description as set forth below, with reference to the accompanying drawings, wherein.

DESCRIPTION OF THE PREFERRED EMBODIMENTS

Figure 1:
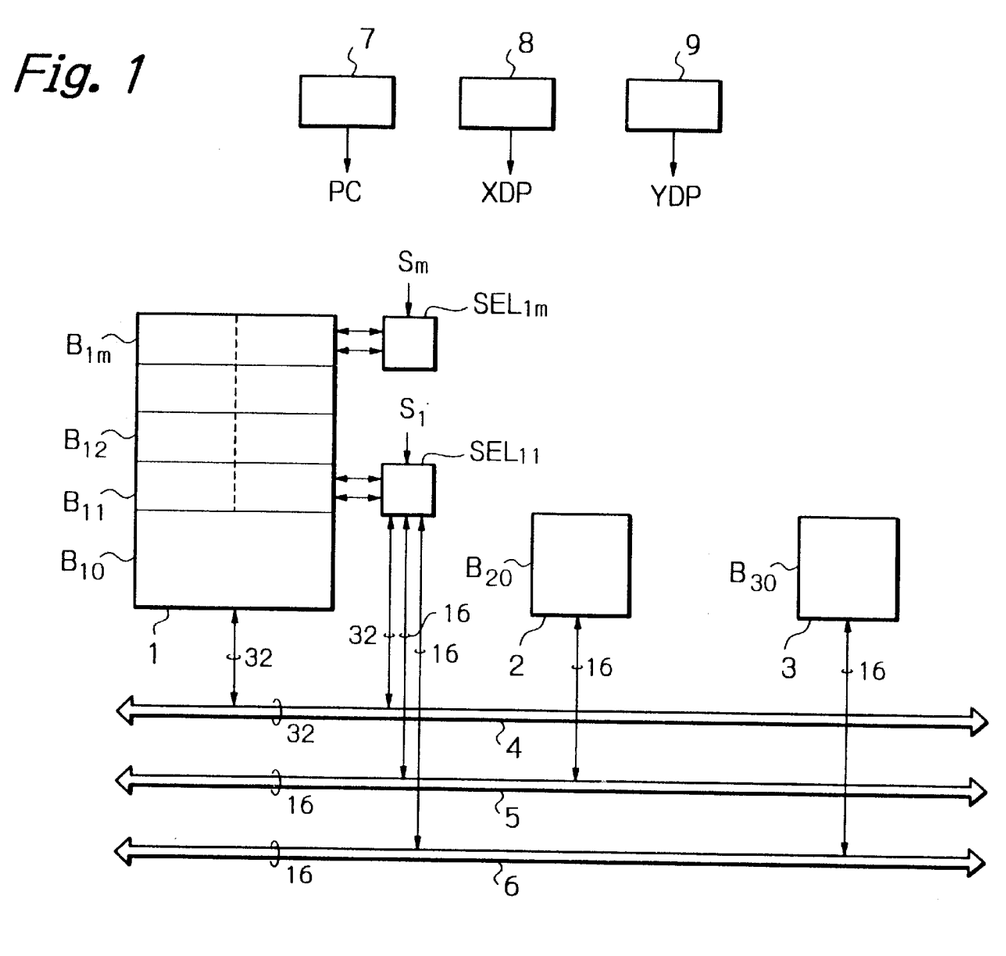
FIG. 1 is a block circuit diagram illustrating a first embodiment of the memory system according to the present invention.

In FIG. 1, which illustrates a first embodiment of the memory system according to the present invention, reference numeral 1 designates a 32-bit program memory formed by blocks $B_{10}, B_{11}, \ldots, B_{1m}$, 2 designates a 16-bit X-data memory formed by a block $B_{20}$, and 3 designates a 16-bit Y-data memory formed by a block $B_{30}$. Also, reference numeral 4 designates a 32-bit program bus, 5 designates a 16-bit X-data bus, and 6 designates a 16-bit Y-data bus.

In the program memory 1, the block $B_{10}$ is connected to the data bus 4, while the blocks $B_{11}, B_{12}, \ldots, B_{1m}$ are connected by respective multi-state selectors $SEL_{11}$, $SEL_{12}, \ldots, SEL_{1m}$ to the program bus 4 or the data buses 5 and 6. For example, if a control signal $S_1$ is "1", the selector $SEL_{11}$ is operated to a state to connect the block $B_{11}$ to the program memory 4, while, if the control signal $S_1$ is "1", the selector $SEL_{11}$ connects the blocks $B_{11}$ to the data buses 5 and 6.

In the X-data memory 2, the block $B_{20}$ is connected to the X-data bus 5, and in the Y-data memory 3, the block $B_{30}$ is connected to the Y-data bus 6.

Further, reference numeral 7 designates a program counter for generating a value PC, 8 designates an X-data pointer for generating a value XDP, and 9 designates a Y-data pointer for generating a value YDP.

The program memory 1, the X-data memory 2 and the Y-data memory 3 are accessed by using the values PC, XDP and YDP.

Figure 2:
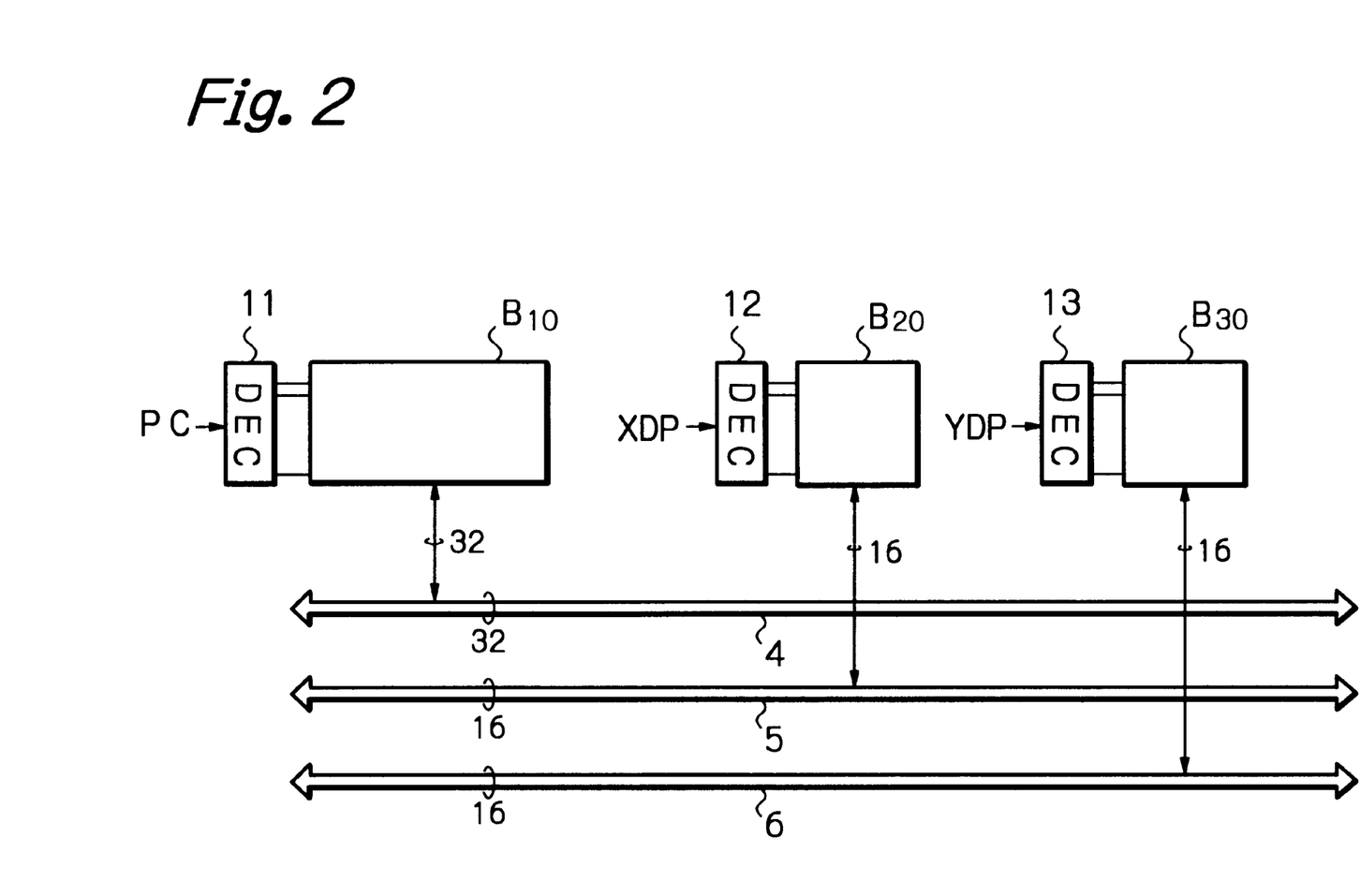
FIG. 2 is a block circuit diagram of the fixed areas of FIG. 1.

The blocks $B_{10}, B_{20}$ and $B_{30}$ are fixed, i.e., dedicated memory areas, with block $B_{10}$ permanently assigned for program use, and blocks $B_{20}$ and $B_{30}$ permanently assigned for data use. Therefore, as illustrated in FIG. 2, the block $B_{10}$ is accessed by an address decoder 11 that receives the value PC, the block $B_{20}$ is accessed by an address decoder 12 that receives the value XDP, and the block $B_{30}$ is accessed by an address decoder 13 that receives the value YDP.

The blocks $B_{11}, B_{12}, \ldots, B_{1m}$ of the program memory 1 are variable non-dedicated memory areas, and may be reallocated for use as data memory if needed. One of the blocks such as $B_{1i}$ is explained next in detail with reference to FIGS. 3A, 3B and 3C.

Figure 3A:
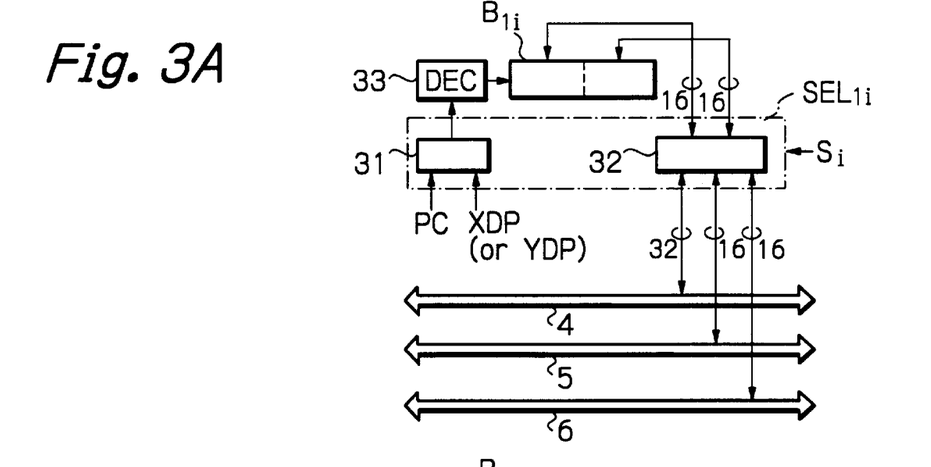
FIG. 3A is a detailed block circuit diagram of the selector of FIG. 1.

As illustrated in FIG. 3A, the selector $SEL_{1i}$ is formed by selectors 31 and 32. The selector 31 is connected via an address decoder 33 to the block $B_{1_i}$. The state of selector $SEL_{1_i}$ determines if memory block $B_{1_i}$ serves as a 32 bit program memory block or as two 16 bit data memory blocks.

Figure 3B:
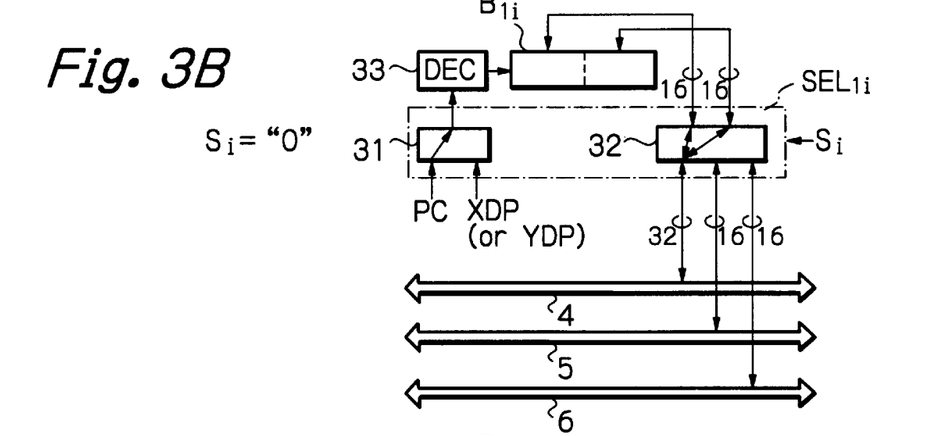
FIGS. 3B and 3C are block circuit diagrams for explaining the operation of the selector of FIG. 3A.

As illustrated in FIG. 3B, when the control signal $S_i$ is "0", the selector 31 selects the value PC and transmits it to the address decoder 33. Simultaneously, the selector 32 connects the 32-bit input/outputs of the block $B_{1_i}$ to the program bus 4. Thus, the block $B_{1_i}$ serves as a program memory block.

Figure 3C:
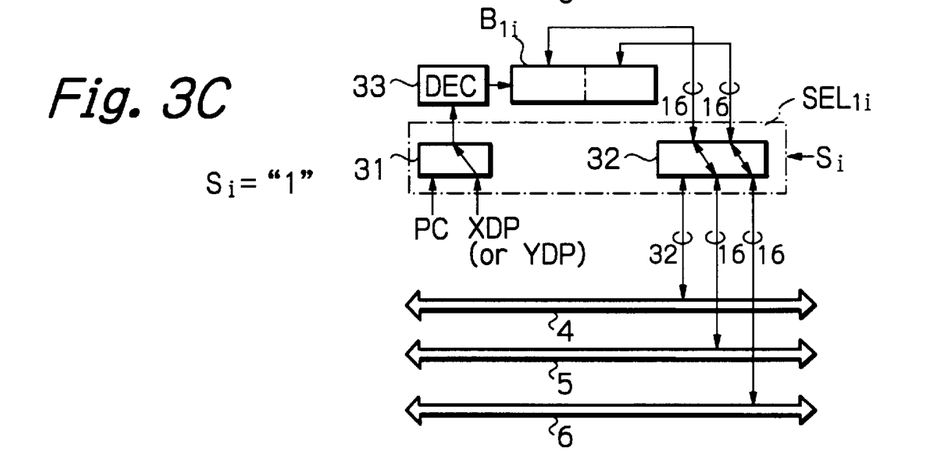

On the other hand, as illustrated in FIG. 3C, when the control signal $S_i$ is "1", the selector 31 selects the value XDP (or YDP) and transmits it to the address decoder 33. Simultaneously, the selector 32 connects the 32-bit input/outputs of the block $B_{1_i}$ to the X-data bus 5 and the Y-data bus 6. Thus, the block $B_{1_i}$ serves as two data memory blocks.

Figure 4:
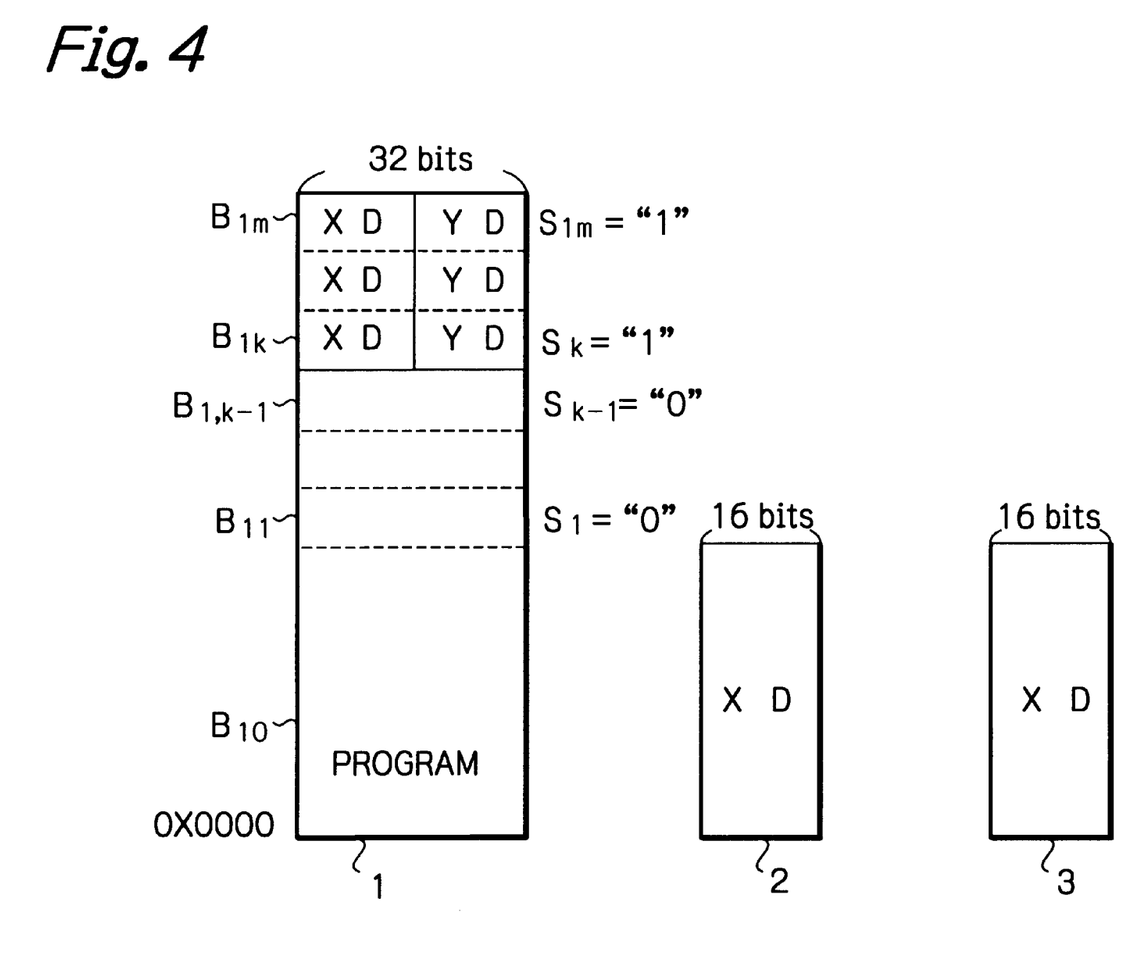
FIG. 4 is a diagram showing memory spaces of the memories of FIG. 1.

The control signal $S_i$ (i–1, 2, ..., m) can be generated by a switch circuit formed by two MOS transistors one of which is normally turned ON by using an impurity diffusion process in advance. Therefore, as illustrated in FIG. 4, if the control signals $S_1, ..., S_{k-1}$ are "0" and the control signals $S_k, ..., S_m$ are "1", the blocks $B_{11}, ..., B_{1_{k-1}}$ as well as the block $B_{10}$ serve as a program memory, and the blocks $B_{20}$ and $B_{30}$ serve as a data memory.

Figure 5:
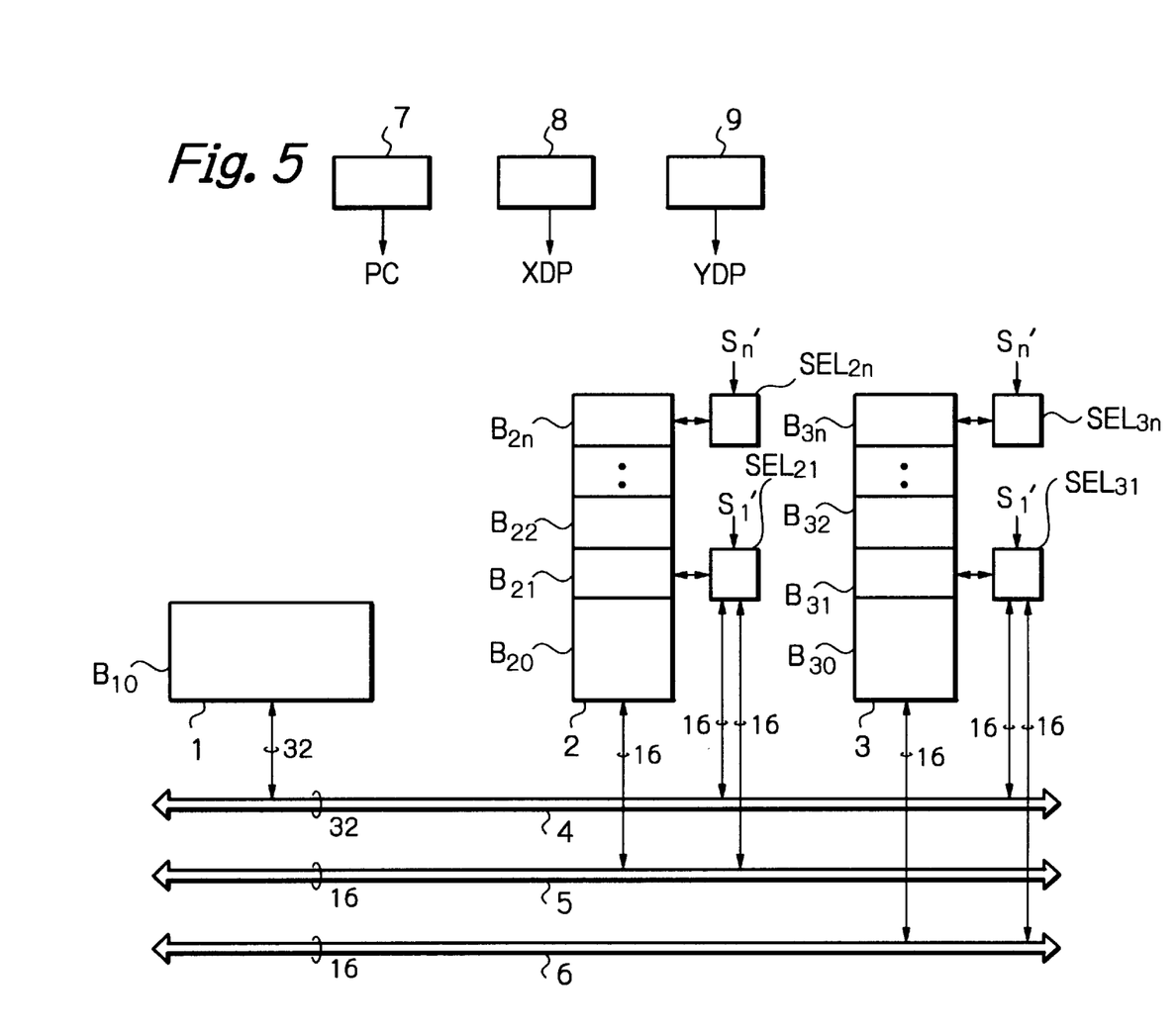
FIG. 5 is a block circuit diagram illustrating a second embodiment of the memory system according to the present invention.

In FIG. 5, which illustrates a second embodiment of the memory system according to the present invention, the blocks variable $B_{11}, B_{12}, ..., B_{2_m}$ of the program memory are not provided. Instead of this, variable blocks $B_{21}, B_{22}, ..., B_{2_n}$ are provided in the X-data memory 2 and variable blocks $B_{31}, B_{32}, ..., B_{3_n}$ are provided in the Y-data memory 3.

In the X-data memory 2, the blocks $B_{21}, B_{22}, ..., B_{2_n}$ are connected by respective selectors $SEL_{21}, SEL_{22}, ..., SEL_{2_n}$ to the program bus 4 or the data bus 5. For example, if a control signal $S_1'$ is "0", the selector $SEL_{21}$ connects the block $B_{21}$ to the X-data bus 5, while, if the control signal $S_1'$ is "1", the selector $SEL_{21}$ connects the blocks $B_{21}$ to the program bus 4.

In the Y-data memory 3 the blocks $B_{31}, B_{32}, ..., B_{3_n}$ are connected by respective multi-state selectors $SEL_{31}, SEL_{32}, ..., SEL_{3_m}$ to the program bus 4 or the data bus 6. For example, if the control signal $S_1'$ is "0", the selector $SEL_{31}$ connects the block $B_{31}$ to the Y-data bus 6, while, if the control signal $S_1'$ is "1", the selector $SEL_{31}$ connects the blocks $B_{31}$ to the program bus 4.

Also, note that the blocks $B_{10}$, $B_{20}$ and $B_{30}$ are fixed areas, as illustrated in FIG. 2, in the same way as in the first embodiment.

The blocks $B_{21}, B_{22}, ..., B_{2_n}$ of the X-data memory 2 and the blocks $B_{31}, B_{32}, ..., B_{3_n}$ of the Y-data memory 3 are variable areas. One of the blocks $B_{21}, B_{22}, ..., B_{2_n}$ such as $B_{2_i}$, and one of the blocks $B_{31}, B_{32}, ..., B_{3_n}$ such as $B_{3_i}$ are explained next in detail with reference to FIGS. 6A, 6B and 6C.

Figure 6A:
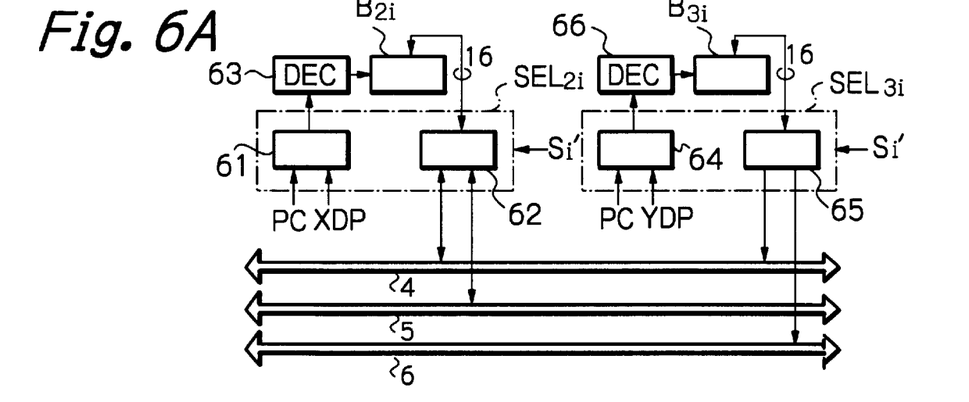
FIG. 6A is a detailed block circuit diagram of the selector of FIG. 5.

As illustrated in FIG. 6A, the selector $SEL_{2_i}$ is formed by selectors 61 and 62. The selector 61 is connected via an address decoder 63 to the block $B_{2_i}$. Similarly, the selector $SEL_{3_i}$ is formed by selectors 64 and 65. The selector 64 is connected via an address decoder 66 to the block $B_{3_i}$. The state of selectors $SEL_{2_i}$ and $SEL_{3_i}$ determines if memory blocks $B_{2_i}$ and $B_{3_i}$ serves as separate 16 bit data memory blocks or as a combined 32 bit program memory block.

Figure 6B:
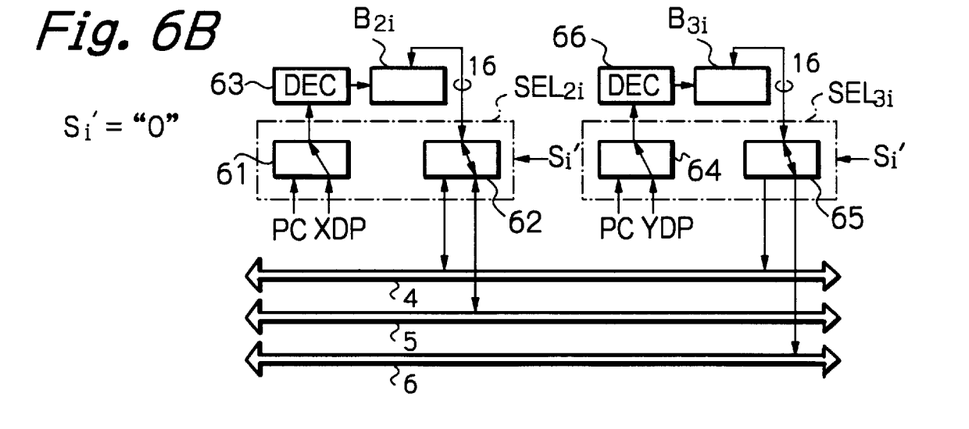
FIGS. 6B and 6C are block circuit diagrams for explaining the operation of the selector of FIG. 6A.

As illustrated in FIG. 6B, when the control signal $S_i'$ is "0", the selector 61 selects the value XDP and transmits it to the address decoder 63. Simultaneously, the selector 62 connects the 16-bit input/outputs of the block $B_{2_i}$ to the X-data bus 5. Similarly, the selector 64 selects the value YDP and transmits it to the address decoder 66. Simultaneously, the selector 65 connects the 16-bit input/outputs of the block $B_{3_i}$ serve as data memory blocks.

Figure 6C:
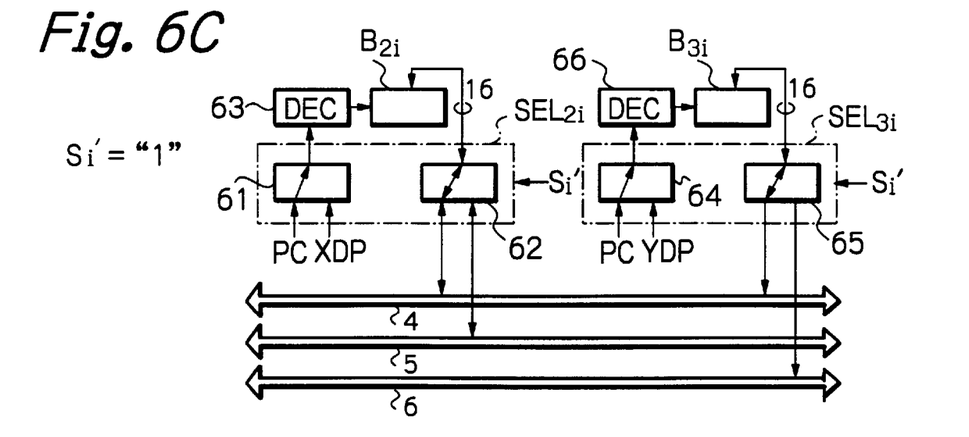

On the other hand, as illustrated in FIG. 6C, when the control signal $S_i'$ is "1", the selector 61 selects the value PC and transmits it to the address decoder 63. Simultaneously, the selector 62 connects the 16-bit input/outputs of the block $B_{2_i}$ to the program bus 4. Similarly, the selector 64 selects the value PC and transmits it to the address decoder 66. Simultaneously, the selector 65 connects the 16-bit input/outputs of the block $B_{3_i}$ to the program bus 4. Thus, the blocks $B_{2_i}$ and $B_{3_i}$ serve as a program memory block.

Figure 7:
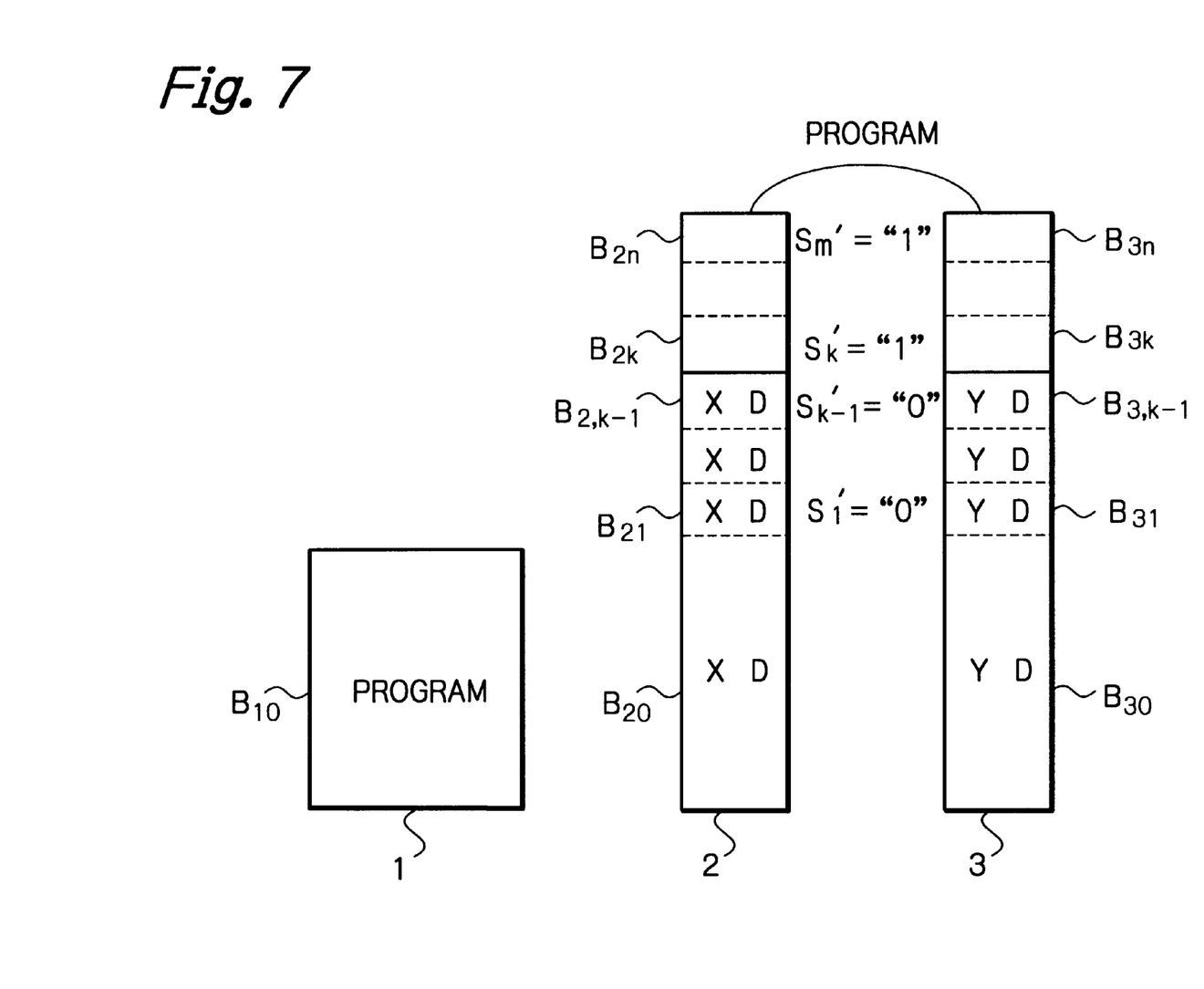
FIG. 7 is a diagram showing memory spaces of the memories of FIG. 5.

As illustrated in FIG. 7, if the control signals $S_1', ..., S_{k-1}'$ are "0" and the control signals $S_k', ..., S_n'$ are "1", the blocks $B_{2_k}, ..., B_{2_n}$ and $B_{3_k}, ..., B_{3_n}$ as well as the block $B_{10}$ serve as a program memory, and the blocks $B_{21}, ..., B_{2_{k-1}}$ and $B_{31}, ..., B_{3_{k-1}}$ as well as the blocks $B_{20}$ and $B_{30}$ serve as a data memory.

Figure 8:
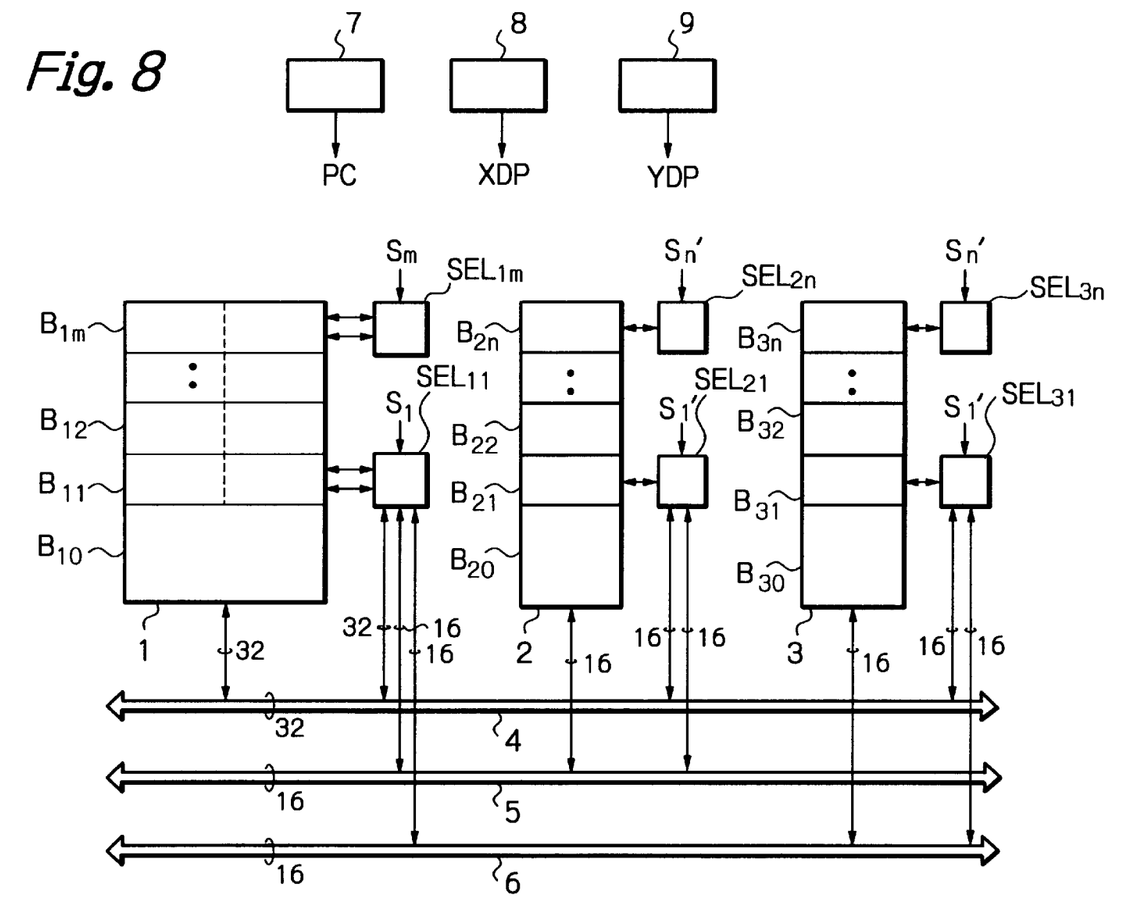
FIG. 8 is a block circuit diagram illustrating a third embodiment of the memory system according to the present invention.

In FIG. 8, which illustrates a third embodiment of the memory system according to the present invention, the memory system of FIG. 1 is combined with the memory system of FIG. 5. That is, in the program memory 1, the block $B_{10}$ is a fixed area which serves as a program memory block, and the blocks $B_{11}, B_{12}, ..., B_{1_n}$ serve as program memory blocks or data memory blocks in accordance with the control signals $S_1, S_2, ..., S_m$, and the resulting states of selectors $SEL_{11}, SEL_{12}, ..., SEL_{1m}$. Also, in the program memories 2 and 3, the blocks $B_{20}$ and $B_{30}$ are fixed areas which serve as data memory blocks, and the blocks $B_{21}, B_{22}, ..., B_{2_n}$ and $B_{31}, B_{32}, ..., B_{3_n}$ serve as program memory blocks or data memory blocks in accordance with the control signals $S_1', S_2', ..., S_m'$.

As explained hereinabove, according to the present invention, since a program space and a data space are relocatable between the program memory and the data memories, effective use is made of the program memory and the data memories.

What is claimed is:

1. A memory system comprising:
   a first memory having a first bid width;
   a second memory having a second bit width different from the first bit width;
   the first memory being comprised of a first and a second memory block;
   the second memory being comprised of at least a first memory block;
   a first bus;
   the first memory block in the first memory being connected to the first bus;
   a second bus;
   the first memory block in the second memory being connected to the second bus;
   a first selector circuit; and
   a circuit which generates a selection signal for the first selector circuit,
   the first selector circuit being responsive to a first value of the selection signal to connect the second memory block in the first memory to the first bus, and responsive to a second value of the selection signal to associate the second memory block in the first memory with the second memory by connecting the second memory block in the first memory to the second bus.

2. A memory system as described in claim 1, in which:
   the second memory is comprised of a first memory unit and a second memory unit, each memory unit being comprised of at least one memory block;
   the second bus is comprised of a first bus unit connected to the first memory block in the first memory unit and a second bus unit connected to the first memory block in the second memory unit; and the first selector circuit is operative in response to the second value of the selection signal to connect a first part of the second memory block in the first memory to the first bus unit, and to connect a second part of the second memory block in the first memory to the second data bus unit.

3. A memory system as described in claim 2, in which:
the first part of the second memory block in the first memory has a third bit width;
the second part of the second memory block in the first memory has a fourth bit width,
the third and fourth bit widths being respectively equal to the first and second bit widths.

4. A memory system as described in claim 3, in which the first through the fourth bit widths are all equal.

5. A memory system as described in claim 2, in which:
the first and second data memory units are each further comprised of:
a second memory block; and further including
a second selector circuit;
a circuit for generating a second selection signal;
the second selector circuit being operative in response to a first value of the second selection signal to connect the second memory block in the first memory unit to the first bus unit, and operative in response to a second value of the second selection signal to connect the second memory block in the first memory unit to the first bus;
a third selector circuit,
a circuit for generating a third selection signal;
the third selector circuit being operative in response to a first value of the third selection signal to connect the second memory block in the second data memory unit to the second data bus unit, and operative in response to a second value of the third selection signal to connect the second memory block in the second data memory unit to the first bus.

6. A memory system according to claim 5, in which values of the second and third selection signals are set simultaneously in their respective first or second states.

7. A memory system as described in claim 1, in which:
the second memory is comprised of:
a first and a second memory unit, each including respective first and second memory blocks; and further including
a second selector circuit;
a circuit for generating a second selection signal;
the second selector circuit being operative in response to a first value of the second selection signal to connect the second memory block in the first memory unit to the first bus unit and operative in response to a second value of the second selection signal to connect the second memory block in the first memory unit to the first bus;
a third selector circuit,
a circuit for generating a third selection signal;
the third selector circuit being operative in response to a first value of the third selection signal to connect the second memory block in the second data memory unit to the second data bus unit, and operative in response to a second value of the third selection signal to connect the second memory block in the second data memory unit to the first base.

8. A memory system according to claim 7, in which values of the second and third selection signals are set simultaneously in their respective first or second states.

9. A memory system comprising:
a data memory which stores data to be processed by a computer program;
an instruction memory, the instruction memory including:
a first memory block which is solely allocated for storage of program instructions for processing data stores in the first memory; and
a second memory block which may be selectively allocated for storage of program instructions or storage of data to be processed;
a data bus connected to the data memory;
an instruction bus connected to the first memory block in the instruction memory;
a first selector circuit,
the first selector circuit being operative in a first state to connect the second memory block in the instruction memory to the instruction bus, and operative in a second state to connect the second memory block in the instruction memory to the data bus; and
a control circuit which is operative to select the state of the first selector circuit,
whereby the second memory block in the instruction memory may be used for storing instructions or data as required.

10. A memory system as described in claim 9, in which:
the data memory is comprised of a first memory unit and a second memory unit;
the data bus is comprised of a first data bus unit connected to the first memory unit and a second data bus unit connected to the second memory unit; and
the first selector circuit is operative in the second state to connect a first part of the second memory block in the instruction memory to the first data bus unit, and to connect a second part of the second memory block in the instruction memory to the second data bus unit.

11. A memory system as described in claim 10, in which:
the first data memory unit and the first data bus unit have a first bit width;
the second data memory unit and the second data bus unit have a second bit width; and
the instruction memory and the instruction bus have a third bit width greater than the first and second bit widths.

12. A memory system as described in claim 11, in which the bit widths of the first and second parts of the second memory block in the instruction memory are respectively equal to the first and second bit widths.

13. A memory system as described in claim 12, in which:
the first and second bit widths are equal to one-half the third bit width.

14. A memory system as described in claim 10, in which:
the first and second data memory units are each comprised of:
a first memory block which is solely allocated to storage of data; and
a second memory block which may be selectively allocated for storage of data or storage of program instructions; and further including
a second selector circuit;
the second selector circuit being operative in a first state to connect the second memory block in the first data memory unit to the first data bus unit, and operative in a second state to connect the second memory block in the first data memory unit to the instruction bus; and
a third selector circuit, the third selector circuit being operative in a first state to connect the second memory block in the second data memory unit to the second data bus unit, and operative in a second state to connect the second memory block in the second data memory unit to the instruction bus.

15. A memory system according to claim 14, further including second and third control circuits which are operative to set the second and third selector circuits simultaneously in their respective first or second states.

16. A memory system for a data processing device comprising:
a first memory which performs a first function;
a second memory, the second memory including:
a first memory block which is solely allocated for performance of a second function; and
a second memory block which may selectively be allocated for performance of the first function or the second function;
a first bus connected to the first memory;
a second bus connected to the first memory block in the second memory;
a first selector circuit,
the first selector circuit being operative in a first state to connect the second memory block in the second memory to the second bus, and operative in a second state to connect the second memory block in the second memory to the first bus; and
a control circuit which is operative to set the first selector circuit in its first or second state,
whereby the second memory block in the second memory may be used for performing the first or the second function as required.

17. A memory system as described in claim 16, in which:
the first memory is comprised of a first memory unit and a second memory unit;
the first bus is comprised of a first bus unit connected to the first memory unit and a second bus unit connected to the second memory unit; and
the first selector circuit is operative in the second state to connect a first part of the second memory block in the second memory to the first bus unit, and a second part of the second memory block in the second memory to the second bus unit.

18. A memory system as described in claim 17, in which:
the first memory unit and the first bus unit have a first bit width;
the second memory unit and the second bus unit have a second bit width; and
the second memory and the instructions bus have a third bit width greater than the first and second bit widths.

19. A memory system as described in claim 18, in which the bit widths of the first and second parts of the second memory block in the second memory are respectively equal to the first and second bit widths.

20. A memory as described in claim 19, in which the first and second bit widths are equal to one-half the third bit width.

21. A memory system as described in claim 17, in which:
the first and second memory units are each comprised of:
a first memory block which is solely allocated to perform the first function; and
a second memory block which may be selectively allocated to perform the first or the second function; and further including:
a second selector circuit,
the second selector circuit being operative in a first state to connect the second memory block in the first memory unit to the first bus unit, and operative in a second state to connect the second memory block in the first memory unit to the second bus; and
a third selector circuit,
the third selector circuit being operative in a first state to connect the second memory block in the second memory unit to the second bus unit, and operative in a second state to connect the second memory block in the second memory unit to the second bus.

22. A memory system according to claim 21, further including second and third control circuits which are operative to set the second and third selector circuits simultaneously in their respective first or second states.

23. A memory system as described in claim 21 in which:
the second function is storage of data to be processed by a computer program; and
the first function is storage of program instructions for processing the data stored in the second memory.

24. A memory system as described in claim 16, in which:
the first function is storage of data to be processed by a computer program; and the second function is storage of program instructions for processing the data stored in the first memory.

25. A memory system as described in claim 16, in which:
the second function is storage of data to be processed by a computer program; and
the first function is storage of program instructions for processing the data stored in the second memory.

26. An integrated circuit digital signal processor comprising:
an internal data memory which stores data to be acted on by the digital signal processor;
an internal data bus connected to the internal data memory;
a internal instruction memory, the internal instruction memory including:
a first memory block which is allocated solely for storage of program instructions for processing data stored in the internal data memory; and
a second memory block which may be selectively allocated for storage of data or program instructions;
an internal instruction bus connected to the first memory block in the internal instruction memory;
a first selector circuit connected to the second memory block in the internal instruction memory,
the first selector circuit being operative in a first state to connect the second memory block in the internal instruction memory to the internal instruction bus and operative in a second state to connect the second memory block in the internal instruction memory to the internal data bus; and
a first control circuit which is operative to select the state of the first selector circuit.

27. A digital signal processor as described in claim 26, in which:
the internal data memory is comprised of a first memory unit and a second memory unit,
the internal data bus is comprised of a first data bus unit connected to the first memory unit and a second data bus unit connected to the second memory unit; and
the first selector circuit is operative in the second state to connect a first part of the second memory block in the internal instruction memory to the first data bus unit, and to connect a second part of the second memory block in the internal instruction memory to the second data bus unit.

28. A digital signal processor as described in claim 27, in which:
the first data memory unit and the first data bus unit have a first bit width;
the second data memory unit and the second data bus unit have a second bit width; and
the instruction memory and the instruction bus have a third bit width greater that the first and second bit widths.

29. A digital signal processor as described in claim 28, in which the bit widths of the first and second parts of the second memory block in the internal instruction memory are respectively equal to the first and second bit widths.

30. A digital signal processor as described in claim 29, in which:
the first and second bit widths are equal to one-half the third bit width.

31. A digital signal processor as described in claim 27, in which:
the first and second data memory units are each comprised of:
a first memory block which is solely allocated to storage of data; and
a second memory block which may be selectively allocated for storage of data or storage of program instructions; and further comprising
a second selector circuit,
the second selector circuit being operative in a first state to connect the second memory block in the first data memory unit to the first data bus unit, and operative in a second state to connect the second memory block in the first data memory unit to the internal instruction bus; and
a third selector circuit,
the third selector circuit being operative in a first state to connect the second memory block in the second data memory unit to the second data bus unit, and operative in a second state to connect the second memory block in the second data memory unit to the internal instruction bus.

32. A digital signal processor as described in claim 31, further including second and third control circuits which are operative to set the second and third selector circuits simultaneously in their respective first or second states.

33. An integrated circuit digital signal processor comprising:
an internal data memory, which stores data to be acted upon by the digital signal processor,
an internal data bus connected to the internal data memory;
an internal instruction memory, the internal instruction memory including:
a first memory block which is allocated solely for storage of program instructions; and
a plurality of second memory blocks which may selectively be allocated for storage of data or program instructions;
a plurality of first selector circuits, each of the first selector circuits being associated with a respective one of the second memory blocks in the internal instruction memory, and operative in a first state to connect the second memory block to the internal program instruction bus and operative in a second state to connect the associated second memory block to the internal data bus; and
a first control circuit which is operative to select the states of each of the first selector circuits.

34. A digital signal processor as described in claim 33, in which:
the internal data memory is comprised of a first memory unit; and a second memory unit,
the internal data bus is comprised of a first data bus unit connected to the first memory unit and a second data bus unit connected to the second memory unit; and
each of the first selector circuits is operative in the second state to connect a first part of the associated second memory block in the internal instruction memory to the first data bus unit, and to connect a second part of the associated second memory block in the instruction memory to the second data bus unit.

35. A digital signal processor as described in claim 34, in which:
the first data memory unit and the firs data bus unit have a first bit width;
the second data memory unit and the second data bus unit have a second bit width; and
the instruction memory and the instruction bus have a third bit width greater than the first and second bit widths.

36. A digital processor as described in claim 35, in which the bit width of the first and second parts of the second memory block in the internal instruction memory are respectively equal to the first and second bit widths.

37. A digital signal processor as described in claim 35, in which:
the first and second bit widths are equal to one-half the third bit width.

38. A digital signal processor as described in claim 34, in which the first and second data memory units are each comprised of:
a first memory block which is solely allocated to storage of data; and
a plurality of second memory blocks each of which may be selectively allocated for storage of data or storage of program instructions; and further comprising:
a plurality of second selector circuits, each associated one of the second memory blocks in the first data memory unit,
each of the second selector circuits being operative in a first state to connect the associated second memory block in the first data memory unit to the first data bus unit, and operative in a second state to connect the second memory block in the first data memory unit to the instruction bus; and
a plurality of third selector circuits, each associated one of the second memory blocks in the second data memory unit,
each of the third selector circuits being operative in a first state to connect the associated second memory block in the second data memory unit to the second data bus unit, and operative in a second state to connect the associated second memory block in the second data memory unit to the instruction bus.

39. A digital signal processor as described in claim 38, further including second and third control circuits which are operative to set the second and third selector circuits simultaneously in their respective first or second states.

* * * * *